US011165773B2

(12) United States Patent
Brockhaus et al.

(10) Patent No.: US 11,165,773 B2
(45) Date of Patent: Nov. 2, 2021

(54) NETWORK DEVICE AND METHOD FOR ACCESSING A DATA NETWORK FROM A NETWORK COMPONENT

(71) Applicant: Siemens Aktiengesellschaft, Munich (DE)

(72) Inventors: Hendrik Brockhaus, Unterbiberg (DE); Jens-Uwe Bußer, Neubiberg (DE); Rainer Falk, Poing (DE)

(73) Assignee: SIEMENS AKTIENGESELLSCHAFT

( * ) Notice: Subject to any disclaimer, the term of this patent is extended or adjusted under 35 U.S.C. 154(b) by 181 days.

(21) Appl. No.: 15/575,884

(22) PCT Filed: May 31, 2016

(86) PCT No.: PCT/EP2016/062214
§ 371 (c)(1),
(2) Date: Nov. 21, 2017

(87) PCT Pub. No.: WO2016/202570
PCT Pub. Date: Dec. 22, 2016

(65) Prior Publication Data
US 2018/0152447 A1    May 31, 2018

(30) Foreign Application Priority Data

Jun. 19, 2015   (DE) .......................... 102015211345.0

(51) Int. Cl.
*H04L 29/06*    (2006.01)
(52) U.S. Cl.
CPC ........ *H04L 63/0876* (2013.01); *H04L 63/029* (2013.01); *H04L 63/0281* (2013.01);
(Continued)

(58) Field of Classification Search
None
See application file for complete search history.

(56) References Cited

U.S. PATENT DOCUMENTS 7,249,177 B1 *   7/2007   Miller .................... G06F 21/32
                                                        709/203
2002/0104016 A1   8/2002   Pan et al.
(Continued)

FOREIGN PATENT DOCUMENTS

CN   102547701 A   7/2012
CN   103517374 A   1/2014
(Continued)

OTHER PUBLICATIONS

Johan Loos, "Implementing IEEE 802.1x for Wired Networks", Version Jun. 2012, SANS Institute, Mar. 14, 2014, p. 1-42. (Year: 2014).*

(Continued)

*Primary Examiner* — Jeffery L Williams
(74) *Attorney, Agent, or Firm* — Schmeiser, Olsen & Watts LLP

(57) ABSTRACT

A network device, including two interfaces for connecting to an access-protected access point of a data network and to a network component which is to be allowed access to the data network via the access point is provided. The network device is designed to be authenticated at the access point using authentication data when the access point is connected and the network component is connected and to allow the connected network component to access the data network via the access point in the event of a successful authentication at least for network components which satisfy one or more specified criteria.

16 Claims, 2 Drawing Sheets

(52) U.S. Cl.
CPC ...... *H04L 63/0823* (2013.01); *H04L 63/0853* (2013.01); *H04L 63/0861* (2013.01); *H04L 63/20* (2013.01); *H04L 63/162* (2013.01)

(56) References Cited

U.S. PATENT DOCUMENTS

| | | | |
|---|---|---|---|
| 2006/0268856 A1* | 11/2006 | Voit | H04L 63/0838 370/389 |
| 2007/0109098 A1 | 5/2007 | Higbie et al. | |
| 2007/0180229 A1* | 8/2007 | Salowey | H04W 12/0471 713/156 |
| 2008/0080373 A1* | 4/2008 | Eldar | H04L 63/162 370/230 |
| 2008/0108322 A1* | 5/2008 | Upp | H04L 63/0892 455/411 |
| 2009/0150665 A1* | 6/2009 | Kaippallimalil | H04L 9/0847 713/153 |
| 2012/0054830 A1 | 3/2012 | Yamada | |
| 2012/0266209 A1* | 10/2012 | Gooding | H04L 63/20 726/1 |
| 2013/0174241 A1* | 7/2013 | Cha | H04L 63/0815 726/7 |
| 2014/0071883 A1* | 3/2014 | Abraham | H04B 7/14 370/315 |
| 2014/0269360 A1* | 9/2014 | Jafarian | H04W 52/0209 370/252 |
| 2014/0304765 A1* | 10/2014 | Nakamoto | H04L 63/20 726/1 |
| 2015/0049671 A1* | 2/2015 | Jafarian | H04W 88/04 370/328 |
| 2015/0121500 A1 | 4/2015 | Venkatanaranappa et al. | |
| 2015/0172269 A1* | 6/2015 | Cha | H04L 63/0815 726/5 |
| 2015/0280916 A1* | 10/2015 | Bjarnason | H04L 9/3213 726/1 |
| 2016/0140330 A1* | 5/2016 | Hoppe | H04L 63/08 726/6 |
| 2016/0337945 A1* | 11/2016 | Watt | H04W 12/08 |
| 2017/0344047 A1 | 11/2017 | Cioraca et al. | |
| 2019/0182746 A1* | 6/2019 | Klein | H04W 8/22 |

FOREIGN PATENT DOCUMENTS

| | | |
|---|---|---|
| CN | 104052790 A | 9/2014 |
| CN | 104641694 A | 5/2015 |
| EP | 2656580 B1 | 12/2014 |
| WO | 2014000564 A1 | 1/2014 |

OTHER PUBLICATIONS

"MAC Authentication Bypass"; Development Guide; XP055245246; Gefunden im Internet: URL:http://www.cisco.com/c/en/us/products/collateral/ios-nx-os-software/identity-based-networking-services/config guide c17-663759.pdf.

PCT International Search Report for PCT International Application No. PCT/EP2016/062214, dated Aug. 10, 2016.

Chinese Office Action for Application No. 201680035875.2, dated Feb. 7, 2021.

* cited by examiner

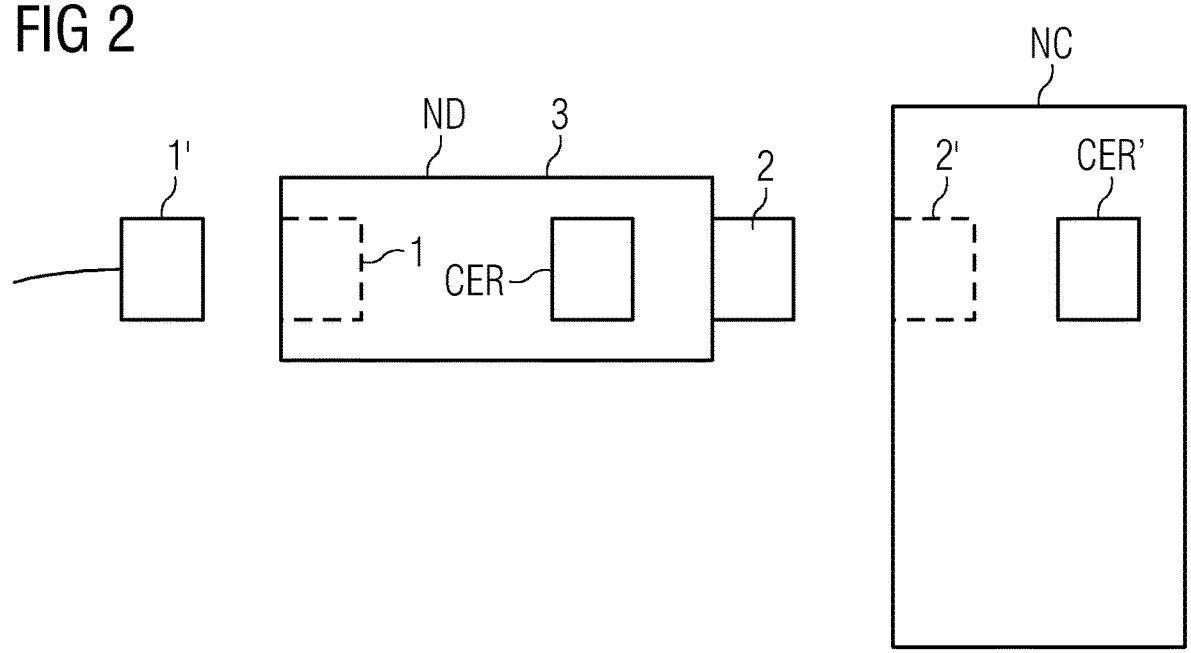
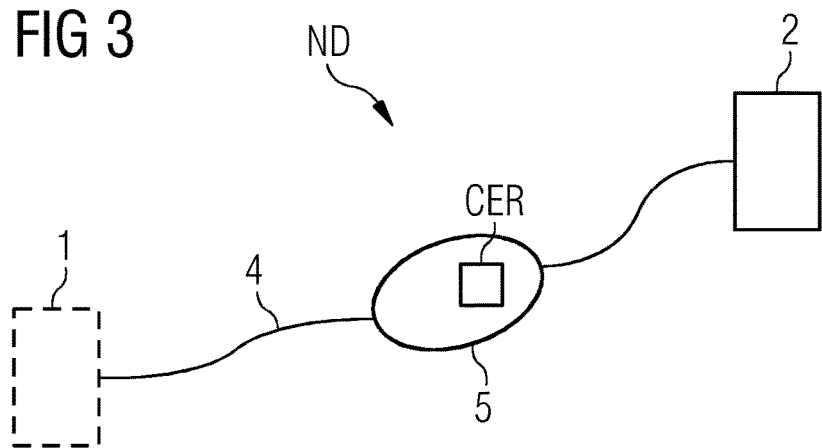

NETWORK DEVICE AND METHOD FOR ACCESSING A DATA NETWORK FROM A NETWORK COMPONENT

CROSS-REFERENCE TO RELATED APPLICATIONS

This application claims priority to PCT Application No. PCT/EP2016/062214, having a filing date of May 31, 2016, based off of German application No. DE 102015211345.0 having a filing date of Jun. 19, 2015, the entire contents of both of which are hereby incorporated by reference.

FIELD OF TECHNOLOGY

The following relates to a network device and a method for a network component to access a data network.

BACKGROUND

Access points for data networks are frequently access-protected by means of suitable methods. This access protection involves the IEEE 802.1X standard, for example, being used. In this case, a network component is provided with access to the data network only if it authenticates itself successfully at the access-protected access point using applicable authentication data. Frequently, the authentication data used are digital certificates, such as e.g. an operator certificate associated with the operator of the data network.

When new network components are integrated in a data network, there is frequently the problem that the authentication data or an applicable operator certificate is/are not yet stored on the network component, since the certificate first needs to be requested in the data network. However, this requires the new network component to access the data network. Accordingly, the authentication data either need to be stored on the new network component in advance or the configuration of the data network needs to be changed in order to allow the new network component to access the data network. The integration of new network components in a data network is therefore complex.

SUMMARY

An aspect relates to providing a network device and a method for a network component to access a data network that can easily be used to integrate new network components in the data network.

The network device according to embodiments of the invention, which is preferably portable, comprises two interfaces for connection to an access-protected access point of a data network and to a network component that is intended to be allowed to access the data network via the access point. Each interface can be provided in dedicated fashion for connection either to an access point or to a network component. Nonetheless, it is also possible for an access point and a network component to be connected to both interfaces if need be, in which case the network device identifies the interface at which the access point or the network component is located. Preferably, the access point or the network component is connected to the applicable interfaces by cable.

The network device according to embodiments of the invention is configured such that it authenticates itself at the access point using authentication data when the access point is connected and the network component is connected and, when authentication is successful, permits the connected network component to access the data network for at least such (connected) network components as satisfy one or more predetermined criteria. In one variant, the access can be permitted following successful authentication for any desired network component. Preferably, however, only network components having particular properties are permitted to access the data network, these properties being stipulated via the predetermined criteria.

Embodiments of the invention have the advantage that interposition of the network device according to the embodiments of the invention between an access-protected access point and a network component to be integrated easily provides the possibility of the network component being provided with access to the data network, in order e.g. to request authentication data for the data network that are not yet stored on the network component. After the authentication data are obtained, the network component can then be connected directly to the access-protected access point by omitting the network device, and can authenticate itself on the data network via the authentication data. This achieves simple integration of new network components in a data network.

The preferred application of embodiments of the invention is access to data networks in the form of communication networks of automation systems. In other words, the interfaces of the network device are set up for connection to an access point of a data network in the form of a communication network of an automation system and for connection to a network component in the form of a device to be integrated in the automation system, and preferably in the form of a field device. The automation system may be an automation installation, particularly for production automation or process automation. Similarly, the automation system may be a traffic automation system, particularly for rail traffic, or a buildings automation system or an energy automation system, for example.

In one particularly preferred embodiment, the network device is set up for communication with a Layer-2 access point. In this case, the term Layer-2 refers to the applicable layer of the OSI reference model. The access point is therefore an access point for LAN or WLAN networks. Preferably, the network device is in this case configured such that it authenticates itself at the access point based on the IEEE 802.1X standard. This standard is known per se and allows access control for devices at an applicable access point.

In one particularly preferred embodiment, the network device is configured such that it permits limited access by the connected network component to the data network. This increases the security in the method. Preferably, the limited access is restricted to requesting of authentication data for the access point from a registration server. Alternatively or additionally, the limited access is restricted to accessing one or more predetermined subnetworks of the data network. For example, access can be permitted only to particular logical VLANs.

In one particularly preferred variant of the embodiment just described, the network device is configured such that the limited access is achieved by means of filtering of data traffic in the network device and/or the tunneling of data traffic in the network device. In this case, known technologies can be used for filtering and tunneling.

In a further preferred variant, the authentication data that the network device uses to authenticate itself comprise a first digital certificate, the first digital certificate preferably being a certificate of the operator of the data network.

The authentication data for the network device are, in one variant of embodiments of the invention, stored on the network device when the latter is started up. In other words, the authentication data may have been stored on the network device even before the latter is started up or they can be stored thereon immediately on startup. Alternatively or additionally, the network device may also be configured such that it generates the authentication data (after it is started up) using identification data of the connected network component. This variant has the advantage that the authentication also involves the connected network component being taken into consideration and, as a result, it is possible e.g. for authentication to be denied for particular network components.

In a further variant of the network device according to embodiments of the invention, the network device stores information that stipulates the connected network components for which the network device permits the access to the data network via the access point. In this manner, such network components as satisfy the predetermined criterion/criteria as in claim 1 are specified. This variant of embodiments of the invention protects the data network very well against the use of forbidden network components. The stored information can explicitly or implicitly stipulate the network components with access permission. For example, the information can include a list of permitted network components. Similarly, the list can also cite nonpermitted network components, access being permitted for all the network components that are not included on the list.

In a further preferred variant, the network device according to embodiments of the invention permit access to the data network for such network components as successfully authenticate themselves to the network device by means of authentication information, which differs from the above authentication data. This authentication information preferably comprises a second digital certificate and particularly a certificate from the manufacturer of the connected network component. This ensures that only network components from particular manufacturers can be integrated in the data network.

In a further preferred embodiment, the network device according to the embodiments of the invention is configured such that it comprises an interface for authenticating a user, wherein one or more predetermined actions that are performable by the network device automatically or when initiated by the user are permitted only on successful authentication of the user via the interface. This efficiently prevents misuse of the network device by unauthorized persons. The predetermined action(s) preferably comprise(s) the activation of the network device for the intended use, i.e. the activation of the network device for authentication at a connected access point and for permitting a connected network component to access the data network. Alternatively or additionally, the predetermined action(s) can also comprise the configuration of the network device by the user, such as e.g. the specification of those connected network components for which the network device permits access to the data network via the access point.

The interface for authenticating a user can comprise, by way of example, a keypad and/or a reader for biometric data and/or a reader for chip cards and/or a mechanical key switch. In this case, mechanical key switch is intended to be understood to mean a switch that can be operated by means of an associated mechanical key, the authentication being successful when the switch is operated by means of the associated mechanical key.

In a further preferred configuration, the network device comprises an interface for manually inputting and/or for reading in identification data from network components. The interface for manual input may be e.g. a keypad, this keypad also being able to be the above interface for authentication if need be. The interface for reading in identification data may be configured e.g. as a code reader (e.g. barcode reader) or RFID reader. Preferably, the network device permits access to the data network only for network components having identification data input and/or read in via the interface.

Embodiments of the invention relate furthermore to a method for a network component to access a data network via an access-protected access point. In this case, the access point and the network component are connected to the network device according to embodiments of the invention or a preferred embodiment of the network device according to the embodiments of the invention via the interfaces of said network device. The method involves the network device authenticating itself at the access point using authentication data and, when authentication is successful, permitting the connected network component to access the data network via the access point for at least such network components as satisfy one or more predetermined criteria.

In one particularly preferred embodiment of this method, the access-protected access point checks the authentication data by communicating with an authentication server that stores rules for successful authentication.

In a further preferred embodiment, the network device is acknowledged as reliable by the access-protected access point in the method only if one or more criteria are satisfied. In other words, the network device can be used in the method only if the criterion/criteria is/are satisfied. The criterion/criteria is/are configured particularly such that the network device can be used only if the data network is in a predetermined mode of operation, e.g. a maintenance mode. If this is not the case, the method of embodiments of the invention does not permit the use of the network device.

BRIEF DESCRIPTION

Some of the embodiments will be described in detail, with reference to the following figures, wherein like designations denote like members, wherein:

FIG. 2 shows a schematic depiction of a first design of the network device; and

FIG. 3 shows a schematic depiction of a second design of the network device.

Figure 1:
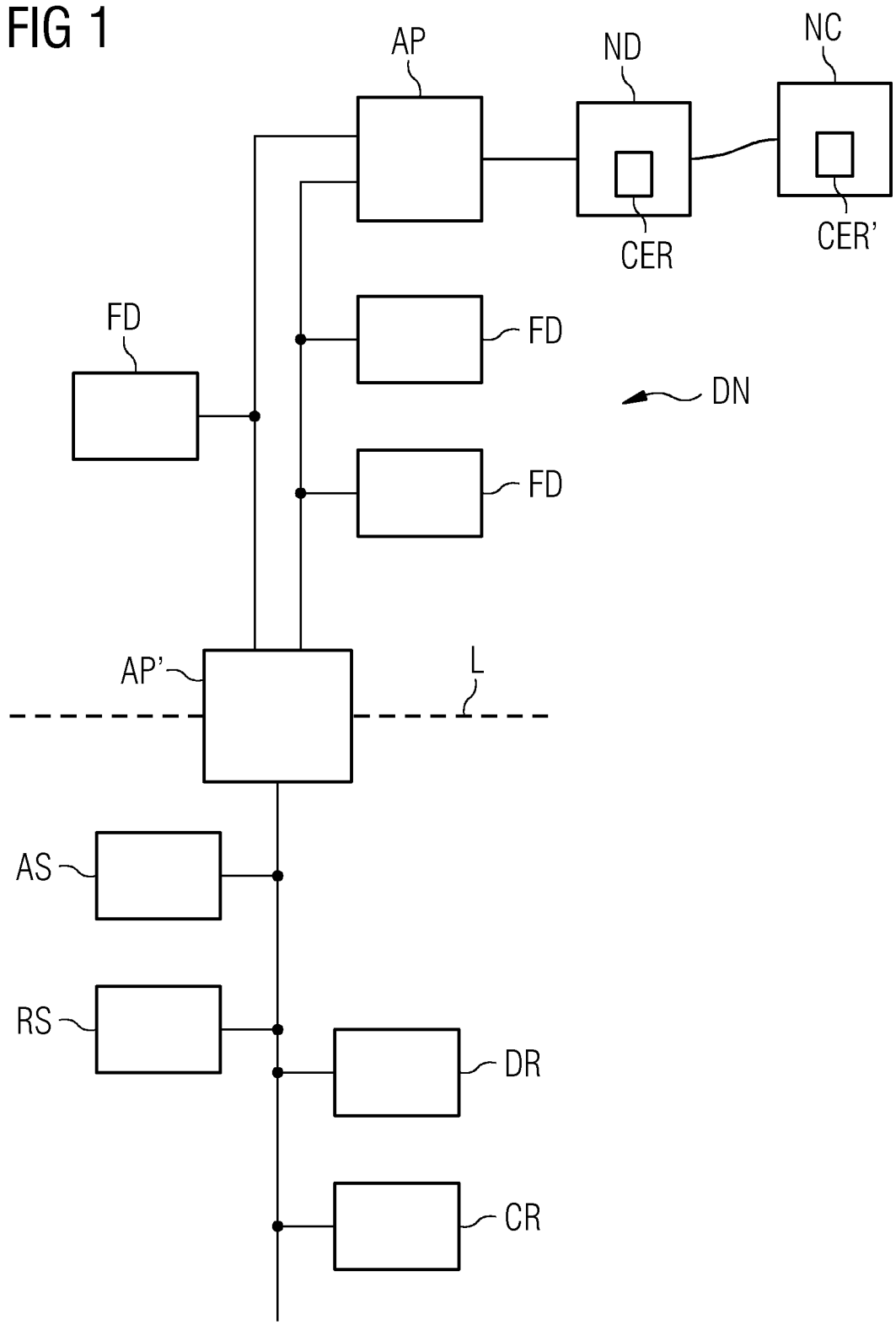
FIG. 1 shows a schematic depiction that clarifies the operation of an embodiment of the network device for the access to a data network.

There follows a description of an embodiment of the invention based on a network device that is connected to an access-protected Layer-2 access point (i.e. Ethernet/LAN or WLAN) and, at this access point, allows a network component to access the data network to which the Layer-2 access point belongs.

DETAILED DESCRIPTION

In FIG. 1, the network device according to embodiments of the invention is denoted by ND. The network device has two interfaces that can be seen from the designs in FIG. 2 and FIG. 3. One of the interfaces is used to connect the access-protected Layer-2 access point AP of a data network DN by means of a cable. The other interface is used to connect a network component NC for which access to the data network DN is intended to be allowed.

In the embodiment described here, the data network is the communication network of an automation system, such as e.g. an automation installation for production automation or for process automation. Similarly, the automation system may be, by way of example, an installation for traffic automation, particularly for rail traffic, or a buildings automation system or an energy automation system. The data network DN comprises a multiplicity of network nodes, the network nodes reproduced in FIG. 1 being not only the access point AP but also multiple field devices FD, the further access point AP', an authentication server AS, a registration server RS and also a diagnosis computer DR and a control computer CR. The part of the data network DN situated above the dashed line L is a local access network of the data network DN with the access-protected access point AP, whereas the part of the data network below line L is a backbone network that can communicate with the upper part of the data network via the access point AP'.

In order to access the data network DN via the access-protected access point AP, a device needs to successfully authenticate itself at this access point by means of authentication data. In the scenario depicted here, a new network component NC is intended to be connected to the data network via the access point AP. The network component NC is a field device of the automation system that has been substituted for an old field device. The field device may be, by way of example, a points drive controller or a track occupancy detector in the case of an automation system for rail traffic. In this case, there is the problem that the new network component NC, when delivered, does not yet store any authentication data for the access to the data network DN. These first need to be requested in the data network DN from the registration server RS by the network component NC. However, this requires the network component NC to have access to the data network. This access is made possible for it by the network component ND according to embodiments of the invention.

The network component ND already stores authentication data for authentication at the access-protected access point AP. These authentication data are based on a digital certificate CER that comes from the operator of the data network. When the network device ND is connected to the access point AP, it authenticates itself at this access point using the certificate CER. This involves the inherently known IEEE 802.1X standard being used. Therefore, the network device ND is subsequently also referred to as an 802.1X proxy.

During authentication using the IEEE 802.1X standard, the access-protected access point AP communicates with the authentication server AS of the data network DN, which verifies the authentication data coming from the network device, the access to the data network via the access point AP being enabled for the network device ND if verification is successful. Preferably, the authentication is effected based on the EAP (EAP=Extensible Authentication Protocol) protocol or based on the EAP-TLS protocol, which is used for a certificate-based authentication. The access point and the authentication server preferably communicate via the RADIUS or Diameter protocol.

After this access is enabled, the device ND also connects the access of the network component NC to the data network ND, provided that the network component NC fulfills a particular property. In the embodiment described here, this property is that the network component has a piece of authentication information in the form of a further digital certificate CER', this certificate being a certificate from the manufacturer of the network component NC. The certificate CER' is checked by the network device ND and, if verification is successful, the network device ND then permits the network component NC to access the data network DN via the access point AP. The network component is then allowed to register with the registration server RS and to request authentication data in the form of a valid certificate for the data network DN. After the requested authentication data have been transmitted from the registration server RS to the network component NC, the network device ND is no longer needed, i.e. the network component NC can then be connected directly to the access point AP without interposition of the network device, and used. The integration of the new network component NC into the data network DN is then complete.

Depending on the configuration of the network device according to embodiments of the invention, the latter can, on successful authentication of the network component NC by the certificate CER', if need be forward all the interchanged data between the network component NC and the data network DN. Preferably, however, the network traffic is filtered, e.g. in order to allow through only data that are needed for requesting a certificate from the registration server RS. Further, it is also possible for only access to particular parts of the data network to be permitted, which is achieved e.g. via the tunneling of the network traffic in the network device ND. This can involve inherently known methods for data tunneling being used, such as e.g. TLS, IPsec or L2TP. If need be, it is also possible for the network traffic to be limited by the network component ND.

In one preferred embodiment of the invention, the network device ND can be permitted to communicate with the data network DN only under predetermined conditions. These conditions may be stored in the access-protected access point e.g. as rules (policy). By way of example, communication by the 802.1X proxy with the data network can be permitted only if the automation system is in a maintenance mode, i.e. the network device can be denied access to the automation network in a regular operative mode. Information that indicates the current mode of operation of the automation system can be provided via the data network by the control computer CR, for example.

In a further embodiment of the invention, the data network is split into multiple different subnetworks that can be realized e.g. via what are known as VLANs (VLAN=Virtual Local Area Network). In this case, one part of the network can relate purely to the control communication in an automation system and another part can relate purely to the diagnosis network communication in the automation system. In such an embodiment, the 802.1X proxy according to the embodiments of the invention can be provided e.g. only with access to the subnetwork for diagnosis network communication. Similarly, however, the 802.1X proxy itself can also permit the connected network component to access only a subnetwork. This can be achieved by virtue of the network device itself adding an applicable VLAN tag of the diagnosis network to all the data packets. In the scenario of FIG. 1, the control computer CR is in this case part of an applicable subnetwork for control communication, whereas the diagnosis computer DR is part of an applicable subnetwork for diagnosis network communication.

In the embodiment explained with reference to FIG. 1, authentication data in the form of the digital certificate CER are stored on the network device ND in advance. In a modified variant, the network device issues a certificate for the authentication based on the IEEE 802.1X standard for itself only after connection of the network component NC to be registered. In other words, the 802.1X proxy contains a local certification authority CA for issuing a certificate. Such issuing of certificates is known from SSL proxies, for example, which are used by companies, inter alia, in order to monitor SSL-TLS communication.

The issued certificate includes identification information of the connected network component NC. This certificate is identified as valid by the data network of the automation system, so that subsequently the network access by the network device and by the network component connected thereto can be enabled. This variant of embodiments of the invention has the advantage that the data network is provided with a piece of information about the identity of the network component. Therefore, depending on predetermined rules (e.g. known serial numbers of network components to be registered), a check can be performed to determine whether network access is permissible. In other words, authentication of the network device is therefore successful only if the identification data are permissible according to predetermined rules.

There follows an explanation of different designs of a network device ND according to embodiments of the invention with reference to FIG. 2 and FIG. 3. In all the designs described, the supply of power to the network device can be provided by means of an integrated battery, via USB cable or based on Power-Over-Ethernet, for example. FIG. 2 depicts a design in which the network device ND is embodied as a box 3 having a first interface 1 in the form of a socket and a second interface 2 in the form of a plug. Socket and plug preferably correspond to the RJ-45 design that is usually used for connecting components in LAN networks. The socket 1 is used to connect a corresponding plug 1' on a network cable that is routed to the access point AP of FIG. 1. By contrast, the plug 2 is plugged into a corresponding socket 2' that is produced on the network component NC. In FIG. 2, it is also possible to see that the network device ND stores the operator certificate CER, whereas the network component NC stores the manufacturer certificate CER'. The design of FIG. 2 can be modified in suitable fashion. In one advantageous modification, the plug 2 protrudes from the box 3 by means of a short LAN cable so as to be able to be plugged in well even under confined spatial circumstances.

A further design of the network device ND is shown in FIG. 3. In this design, the network device is embodied as a LAN extension cable 4, the logic of the network device being integrated in a section 5 of the LAN cable. This also stores the certificate CER. The interfaces of the network device are the applicable ends of the LAN extension cable, one end being formed by a socket 1 and the other end by a plug 2, with socket and plug preferably again corresponding to the RJ-45 design.

In a further design, not shown, the network device includes, instead of a plug and a socket, two LAN sockets that can be connected to the access point AP and the network component NC via a respective additional LAN connecting cable. Similarly, in a further design, it is possible for the network device to have two LAN cables with applicable plugs, one end of which can be connected to a socket of the access point AP and the other end of which can be connected to a socket of the network component NC. The plugs are preferably again based on the RJ-45 design.

The two connections or interfaces 1, 2 for connection to the access point AP and the network component NC on the network device ND are preferably identified differently so that a user knows which connection he needs to connect to the data network and which one he needs to connect to the network component. Alternatively, however, there is also the possibility of each of the interfaces being able to be used either for the connection to an access point or the connection to a network component. In this case, the network device attempts, following connection of the access point and of the network component, to perform authentication both on one and on the other interface. If the authentication is successful on one side, then the network device accordingly automatically provides the connection to the data network on the other side.

Instead of established RJ-45 connections, it is also possible for other interfaces to be used in the network device if the network component to be connected or the access point has other interfaces, for example has interfaces for optical fibers. Additionally or alternatively, it is possible to use e.g. a USB interface on the network device, via which this device is connected to the network component or the access point.

Depending on configuration, the network device ND can be activated automatically by virtue of the network connections being plugged in on the applicable interfaces. If need be, the activation can also be performed manually by a user, however, e.g. by pushing a built-in push button switch.

In order to prevent unauthorized penetration of the data network by means of a misused 802.1X proxy, activation of the proxy requires authentication of the user in one variant of embodiments of the invention. This authentication can be effected, by way of example, by means of a chip card being plugged in, via a chip card contactlessly (e.g. using RFID) communicating with the network device, via the input of a PIN on a keypad in the housing of the network device, via biometric authentication (e.g. by means of a fingerprint sensor) or via a mechanical key switch.

If need be, it is also possible for particular authorizations to be coupled to an authentication of a user. This can involve different authorizations being stipulated for different users if need be. In particular, a particular user can be defined as an administrator, only this user being able to perform configuration of the network device following successful authentication. As part of this configuration, the user can stipulate in which period, at which location and which types of network components are intended to be permitted to communicate with the data network by the network device, for example. This reduces the possibility of misuse of an 802.1X proxy.

In the embodiments described above, access by network components to the data network has been permitted by the network device only if the network component has an applicable digital manufacturer certificate. In other words, the network device stores information in regard to the verification of this manufacturer certificate, such as e.g. the root certificate of the entity that issues the manufacturer certificates, or a fingerprint (hash) of the digital manufacturer certificate. If need be, it is also possible for other or further information in regard to the identification or authentication of permissible network components to be stored in the network device according to embodiments of the invention. This may be permitted serial numbers or public keys, for example. Only if the 802.1X proxy identifies or authenticates the connected network component as a permissible device is the network communication thereof connected.

In the above, the authentication of the network device to the access point has been performed based on the IEEE 802.1X standard. Alternatively, however, it is also possible for other standards to be used. For example, the authentication can also be effected via TLS (TLS=Transport Layer Security) or PANA (PANA=Protocol for Carrying Authentication for a Network Access). Storage of authentication information for permissible network components is preferably possible in a specially protected mode of operation of the 802.1X proxy. This allows e.g. a security administrator of the data network to first register permissible devices. A maintenance engineer can then incorporate only the devices registered in the 802.1X proxy into the data network in situ. The authentication information can be input into the 802.1X proxy manually via a user who has preferably authenticated himself on the device in suitable fashion beforehand. If need be, the authentication data can also be captured via a barcode reader or RFID reader that is provided on the network device. The barcode or RFID tag may be attached to the network component, to the packaging thereof or to an accompanying document.

In a further preferred embodiment, the network device provides a secure connection (e.g. TLS or IPsec tunnel) only for particular nodes or components in the data network, for example for a local registration authority, which is indicated by the registration server RS in FIG. 1. The connected network component cannot communicate with other components. The effect achieved by this is that the network component to be registered is not connected to the data network directly at network level. In contrast to a quarantine VLAN, as is known from the IEEE 802.1X standard, the access points of the data network do not have to support quarantine VLAN/VLAN separation in this case. This facilitates the configuration of the access points, and it is possible for simple access points with little intelligence to be used.

In a further variant of embodiments of the invention, the 802.1X proxy can be used to grant any network component access to the data network without checking authentication data for these components. Such access is preferably subject to a time restriction. This access can be used e.g. for maintenance work. In this case, the network component connected to the 802.1X proxy is the computer or the laptop of an external maintenance engineer.

The embodiments of the invention that are described above have a series of advantages. The network device according to embodiments of the invention can be used by a service engineer during fresh installation or replacement of a network component (e.g. a field device) to easily perform initialization thereof. To this end, he first connects the network device according to embodiments of the invention between the applicable access point and the network component. Said network device then permits at least limited access by the network component to the data network, so that the network component can request authentication data in the data network. After the authentication data are obtained, the network device can be removed and the network component can be connected directly to the access-protected access point.

The enabling of a port at the access point that allows communication with the network component connected to the network device can be performed reliably and in a very user friendly manner at the site of the network device without the administration of the access point being necessary. In particular, it is not necessary to visit the site of the access point or to establish the exact port at the access point.

Without the use of the network device according to embodiments of the invention, it would be necessary to temporarily change the configuration of the access point in order to allow a network component to access the data network. However, this has the disadvantage that it is often forgotten to cancel the configuration again as soon as the network component is running without error on the data network. This means that security gaps can remain that are not noticed. By contrast, the connected network device is much more conspicuous and is less easily forgotten. No later than when the network device is next used, the absence of the device will be conspicuous to the engineer.

The network device according to embodiments of the invention only needs to be interposed briefly between the access point and the network component until the initialization or registration of the network component in the data network has been successful. Subsequently, it can be withdrawn again, whereupon the enabling of the applicable port at the access point ends automatically.

Additional authentication mechanisms for the user on the network device according to embodiments of the invention allow misuse of a stolen device by third parties to be prevented. If need be, an administration on the applicable authentication server in the data network can revoke the authentication data of lost network devices, so that they can no longer be used.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for granting network component access to a data network via an access-protected access point, comprising:
   providing a network device, the network device comprising a first interface for connection to an access-protected access point of a data network and a second interface,
   providing a network component that has not yet directly accessed the data network via the access-protected access point and does not yet store authentication data for the network component to access the access point,
   connecting the network device to the access-protected access point of the data network at the first interface and to the network component at the second interface,
   authenticating, by the network device, at the access-protected access point using authentication data for the network device when the access-protected access point is connected and the network component is connected,
   granting permission, by the network device, for the connected network component to access the data network via the network device and the access-protected access point if the connected network component satisfies one or more predetermined criteria,
   providing limited access, by the network device, to the data network for the connected network component, wherein the limited access is restricted to requesting or obtaining authentication data for the network component to access the data network from a registration server, and
   using the requested or obtained authentication data to allow the network component to directly access the data network.

2. The method of claim 1, further comprising:
   disconnecting the network device after the requested or obtained authentication data for the network component to access the access-protected access point is obtained by the connected network component.

3. The method of claim 1, further comprising:
   connecting to the access-protected access point, by the network component directly, and authenticating on the data network, by the network component directly, using the obtained authentication data for the network component to access the access-protected access point.

4. The method of claim 3, wherein the network component connects and authenticates without the network device being connected.

5. The method of claim 1, wherein each of the two interfaces comprises at least one of a plug and a socket.

6. The method of claim 1, wherein the first interface is set up for connection to an access point of a data network in the form of a communication network of an automation system and for connection to a network component in the form of a device to be integrated in the automation system.

7. The method of claim 1, wherein the network device is set up for communication with a Layer-2 access point, the network device being configured such that it authenticates itself at the access point based on the IEEE 802.1X standard.

8. The method of claim 1, wherein the requested or obtained authentication data for the network component to access the access point is sent to the network component from the registration server.

9. The method of claim 1, wherein the network device is configured such that the limited access is achieved by at least one of filtering of data traffic in the network device and the tunneling of data traffic in the network device.

10. The method of claim 1, wherein the authentication data for the network device that the network device uses to authenticate itself comprise a first digital certificate, the first digital certificate being a certificate of the operator of the data network.

11. The method of claim 1, wherein the authentication data for the network device are stored on the network device when the latter is started up, or the network device generates the authentication for the network device data using identification data of the connected network component.

12. The method of claim 1, wherein the network device stores information that stipulates the connected network components for which the network device permits the access to the data network via the access point.

13. The method of claim 1, wherein the network device permits access to the data network for such network components as successfully authenticate themselves to the network device by authentication information, the authentication information comprising a second digital certificate wherein said second digital certificate is a certificate from the manufacturer of the connected network component.

14. The method of claim 1, wherein the network device comprises an interface for authenticating a user, wherein one or more predetermined actions that are performable by the network device automatically or when initiated by the user are permitted access only on successful authentication of the user via the interface, the predetermined action(s) comprising the activation of the network device for authentication at a connected access point and for permitting a connected network component to access at least one of the data network and the configuration of the network device by the user.

15. The method of claim 14, wherein the interface for authenticating a user comprises at least one of a keypad and a reader for biometric data and a reader for chip cards and a mechanical key switch.

16. The method of claim 1, wherein the network device comprises an interface for at least one of manually inputting and reading in identification data from network components, the network device permitting access to the data network only for network components having at least one of identification data input and read in via the interface.

* * * * *